(12) United States Patent
Kim et al.

(10) Patent No.: US 10,194,779 B2
(45) Date of Patent: Feb. 5, 2019

(54) CLEANER HOLDER

(71) Applicant: LG Electronics Inc., Seoul (KR)

(72) Inventors: Namhee Kim, Seoul (KR); Bohyun Nam, Seoul (KR); Jungbae Hwang, Seoul (KR); Jinju Kim, Seoul (KR); Sehwan Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/918,080

(22) Filed: Mar. 12, 2018

(65) Prior Publication Data

US 2018/0199778 A1    Jul. 19, 2018

Related U.S. Application Data

(63) Continuation of application No. 15/590,187, filed on May 9, 2017.

(30) Foreign Application Priority Data

May 9, 2016   (KR) .................. 10-2016-0056462
Aug. 25, 2016 (KR) .................. 10-2016-0108639
(Continued)

(51) Int. Cl.
  *A47L 9/28*   (2006.01)
  *A47L 5/28*   (2006.01)
  (Continued)

(52) U.S. Cl.
  CPC .............. *A47L 9/28* (2013.01); *A47L 5/225* (2013.01); *A47L 5/26* (2013.01); *A47L 5/28* (2013.01);
  (Continued)

(58) Field of Classification Search
  CPC ... A47L 5/00; A47L 5/225; A47L 5/26; A47L 5/28; A47L 9/00; A47L 9/0063; A47L 9/28; A47L 9/2873; A47L 9/2884; H01M 10/44
  See application file for complete search history.

(56) References Cited

U.S. PATENT DOCUMENTS 9,155,431 B2    10/2015 Dyson et al.
2011/0219566 A1*  9/2011 Dyson ..................... A47L 5/24
                                                   15/323
(Continued)

FOREIGN PATENT DOCUMENTS

CN     105395132    3/2016
JP       3015517    9/1995
(Continued)

OTHER PUBLICATIONS

JP 2001149289 A—Jun. 2001—English Machine Translation.*
(Continued)

*Primary Examiner* — Marc Carlson
(74) *Attorney, Agent, or Firm* — Fish & Richardson P.C.

(57) ABSTRACT

A cleaner holder includes: a first body having a first charging port configured to charge a cleaner; a second body protruding from the first body to support the cleaner; and a battery accommodating space recessed in one surface of the second body and configured to accommodate a battery detachably mounted to the cleaner, wherein a second charging port configured to charge the battery is provided in the second body.

20 Claims, 10 Drawing Sheets

(30) Foreign Application Priority Data

| Aug. 25, 2016 | (KR) | 10-2016-0108640 |
| Aug. 25, 2016 | (KR) | 10-2016-0108641 |
| Aug. 25, 2016 | (KR) | 10-2016-0108642 |
| Aug. 25, 2016 | (KR) | 10-2016-0108643 |
| Dec. 15, 2016 | (KR) | 10-2016-0171723 |
| Dec. 23, 2016 | (KR) | 10-2016-0177828 |

(51) Int. Cl.
- *H01M 10/44* (2006.01)
- *A47L 5/00* (2006.01)
- *A47L 9/00* (2006.01)
- *A47L 5/22* (2006.01)
- *A47L 5/26* (2006.01)

(52) U.S. Cl.
CPC .......... *A47L 9/0063* (2013.01); *A47L 9/2873* (2013.01); *A47L 9/2884* (2013.01); *H01M 10/44* (2013.01); *A47L 5/00* (2013.01); *A47L 9/00* (2013.01)

(56) References Cited

U.S. PATENT DOCUMENTS

| 2011/0219571 | A1* | 9/2011 | Dyson | A47L 5/24 |
| | | | | 15/344 |
| 2013/0328523 | A1* | 12/2013 | Ota | H02J 7/0045 |
| | | | | 320/107 |
| 2016/0051109 | A1* | 2/2016 | Hwang | A47L 5/225 |
| | | | | 15/339 |
| 2016/0174787 | A1* | 6/2016 | Conrad | A47L 5/24 |
| | | | | 15/329 |
| 2017/0319034 | A1* | 11/2017 | Kim | A47L 5/28 |
| 2017/0319035 | A1* | 11/2017 | Kim | A47L 5/28 |
| 2017/0319036 | A1* | 11/2017 | Kim | H01M 2/1066 |
| 2017/0319037 | A1* | 11/2017 | Kim | A47L 5/225 |
| 2017/0319038 | A1* | 11/2017 | Kim | A47L 5/28 |
| 2017/0319039 | A1* | 11/2017 | Kim | A47L 9/2873 |
| 2018/0125314 | A1* | 5/2018 | Kim | A47L 9/0063 |

FOREIGN PATENT DOCUMENTS

| JP | H11205427 | | 7/1999 | |
| JP | 2001149289 | | 6/2001 | |
| JP | 2001149289 A | * | 6/2001 | |
| JP | 2004121469 | | 4/2004 | |
| JP | 2004241342 | | 8/2004 | |
| JP | 2014124443 | | 7/2014 | |
| JP | 2014200379 | | 10/2014 | |
| JP | 2014200379 A | * | 10/2014 | |
| JP | 2015012946 | | 1/2015 | |
| JP | 2015012946 A | * | 1/2015 | |
| JP | 2015119879 A | * | 7/2015 | |
| JP | 2015134131 | | 7/2015 | |
| JP | WO 2016114038 A1 | * | 7/2016 | A47L 5/24 |
| KR | 20-1998-0018401 | | 7/1998 | |
| KR | 2019980018401 | | 7/1998 | |
| KR | 20-0194997 | | 9/2000 | |
| KR | 200246448 | | 8/2001 | |
| KR | 10-2003-0041568 | | 5/2003 | |
| KR | 100614320 | | 8/2006 | |
| KR | 10-2012-0103956 | | 9/2012 | |
| KR | 10-2012-0103964 | | 9/2012 | |
| KR | 10-2016-0023134 | | 3/2016 | |
| KR | 1020160023134 | | 9/2016 | |
| WO | 2015129387 | | 3/2017 | |
| WO | 2017101542 | | 6/2017 | |

OTHER PUBLICATIONS

JP 2014200379 A—Oct. 2014—English Machine Translation.*
International Search Report in International Application No. PCT/KR2017/004735, dated Aug. 9, 2017, 3 pages (with partial English translation).
International Search Report in International Application No. PCT/KR2017/004740, dated Jul. 27, 2017, 3 pages (with partial English translation).
International Search Report in International Application No. PCT/KR2017/004392, dated Aug. 7, 2017, 3 pages (with partial English translation).
International Search Report in International Application No. PCT/KR2017/004391, dated Jul. 28, 2017, 3 pages (with partial English translation).
International Search Report in International Application No. PCT/KR2017/004278, dated Jun. 29, 2017, 3 pages (with partial English translation).
International Search Report in International Application No. PCT/KR2017/004276, dated Jun. 29, 2017, 3 pages (with partial English translation).
International Search Report in International Application No. PCT/KR2017/004741, dated Jul. 28, 2017, 3 pages (with partial English translation).

* cited by examiner

CLEANER HOLDER

CROSS-REFERENCE TO RELATED APPLICATIONS

This application is a continuation of U.S. application Ser. No. 15/590,187, filed on May 9, 2017, which claims priority under 35 U.S.C. § 119 to Korean Patent Application No. 10-2016-0056462, filed in Korea on May 9, 2016, Korean Patent Application No. 10-2016-0108639, filed in Korea on Aug. 25, 2016, Korean Patent Application No. 10-2016-0108640, filed in Korea on Aug. 25, 2016, Korean Patent Application No. 10-2016-0108641, filed in Korea on Aug. 25, 2016, Korean Patent Application No. 10-2016-0108642, filed in Korea on Aug. 25, 2016, Korean Patent Application No. 10-2016-0108643, filed in Korea on Aug. 25, 2016, Korean Patent Application No. 10-2016-0171723, filed in Korea on Dec. 15, 2016, and Korean Patent Application No. 10-2016-0177828, filed in Korea on Dec. 23, 2016, whose entire disclosure is hereby incorporated by reference.

BACKGROUND

The present disclosure relates to a cleaner holder.

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner holder are disclosed in Korean Patent Application Publication No. 10-2012-0103956 as the prior art.

The vacuum cleaner holder according to the prior art includes a pedestal for holding a head of a vacuum cleaner to simultaneously charge and hold the vacuum cleaner and a support having charging pins for charging the vacuum cleaner.

Meanwhile, the vacuum cleaner holder according to the prior art, which holds a vacuum cleaner having a center on a lower side thereof, is inserted into support pieces on a lower side of the vacuum cleaner to support the vacuum cleaner. However, in case of a cleaner having a center on an upper side thereof, because a charging terminal should be provided on an upper side, the cleaner holder according to the prior art may not hold the cleaner.

SUMMARY

The present disclosure provides a cleaner holder which may simultaneously charge a cleaner and a battery, and which be used in a stand type or a wall-mounted type, as needed.

The present disclosure provides a cleaner holder which may be used while being supported by a floor.

A cleaner holder includes: a first body having a first charging port configured to charge a cleaner; a second body protruding from the first body to support the cleaner; and a battery accommodating space recessed in one surface of the second body and configured to accommodate a battery detachably mounted to the cleaner, wherein a second charging port configured to charge the battery is provided in the second body.

A cleaner holder which is fixed to a wall surface includes: a first body which is fixed to the wall surface on a rear surface of the first body and has a first charging port formed on a front surface of the first body to charge a cleaner, and of which the front surface is in contact with a first surface of the cleaner; a second body which protrudes from the first body and of which an upper surface supports a second surface of the cleaner; and a locking part provided on the first body and coupled to the cleaner.

A cleaner holder which is placed and used on a floor includes: a first body which is seated on the floor on a rear surface of the first body and has a first charging port formed on an upper surface of the first body to charge a cleaner and of which the upper surface is in contact with a first surface of the cleaner; a second body which protrudes upward from the first body, a second surface of the cleaner being supported by a side surface of the second body; and a locking part provided in the second body and coupled to the cleaner body.

BRIEF DESCRIPTION OF THE DRAWINGS

Embodiments will be described in detail with reference to the following drawings in which like reference numerals refer to like elements, and wherein.

DETAILED DESCRIPTION OF THE EMBODIMENTS

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", "coupled" or "joined" to the latter with a third component interposed therebetween.

Figure 1:
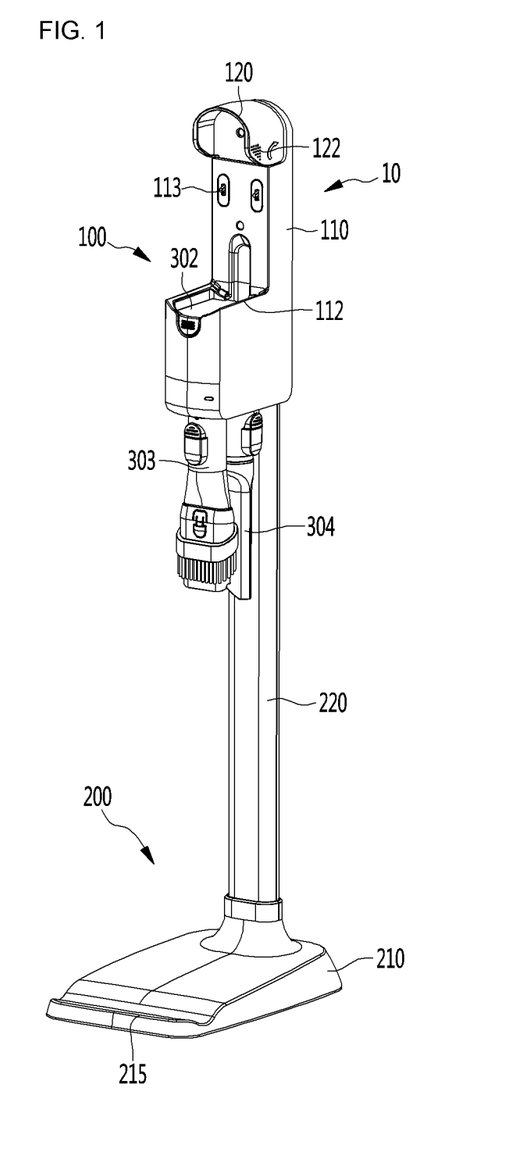
FIG. 1 is a perspective view illustrating a cleaner holder according to an embodiment of the present disclosure.
Figure 2:
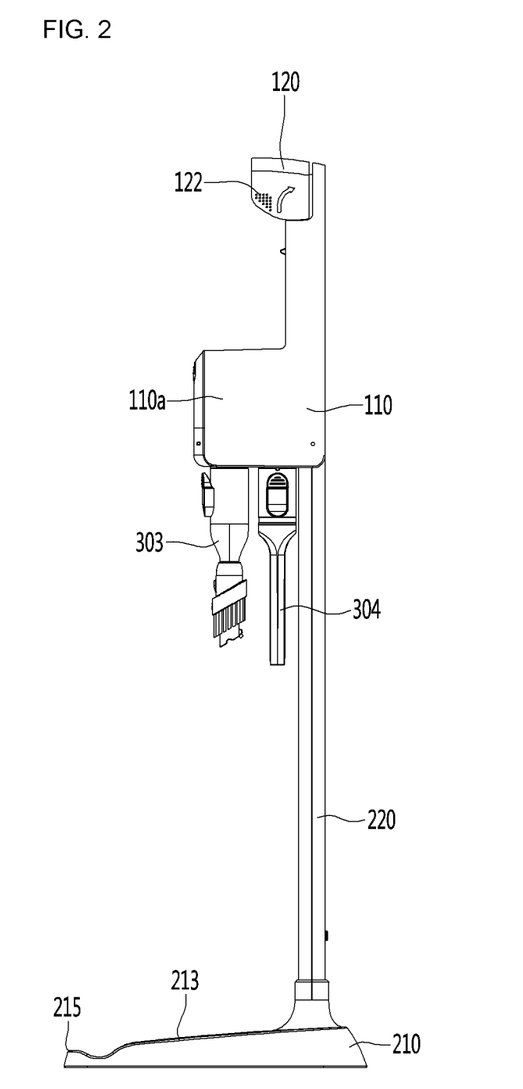
FIG. 2 is a front view of the cleaner holder of FIG. 1.
Figure 3:
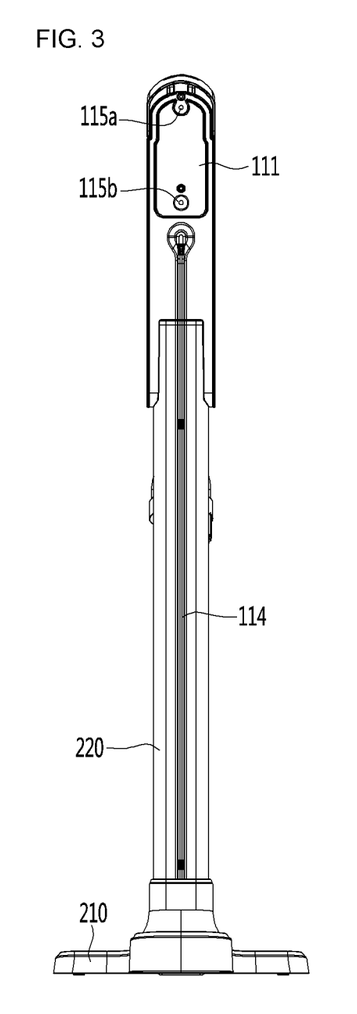
FIG. 3 is a rear view of the cleaner holder of FIG. 1.
Figure 4:
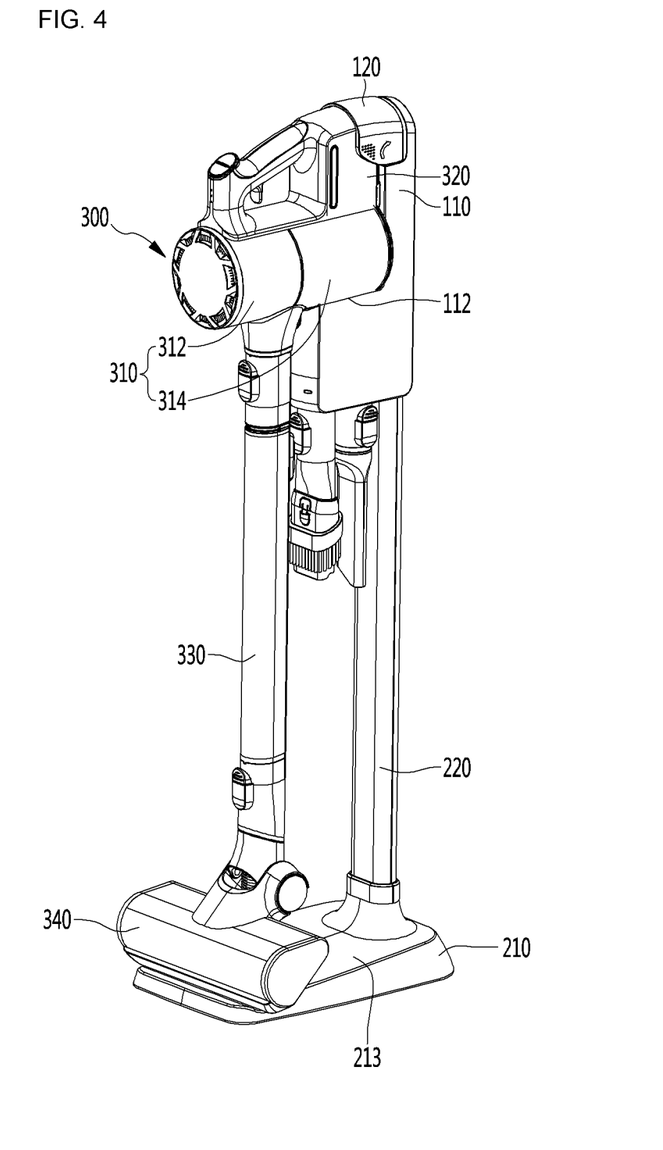
FIG. 4 is a view illustrating a state in which a cleaner is held on the cleaner holder.

FIG. 1 is a perspective view illustrating a cleaner holder according to an embodiment of the present disclosure, FIG. 2 is a front view of the cleaner holder of FIG. 1, FIG. 3 is a rear view of the cleaner holder of FIG. 1, and FIG. 4 is a view illustrating a state in which a cleaner is held on the cleaner holder.

Referring to FIGS. 1 and 4, a cleaner holder 10 according to the embodiment of the present disclosure includes a charging stand 100 for charging a battery of the cleaner 300. The charging stand 100 may simultaneously support the cleaner 300 and charge the battery provided in the cleaner 300.

The cleaner 300 may include a cleaner body 310 having a suction motor, a battery housing 320 in which the battery is accommodated, an extension tube 330 and a suction nozzle 340. The cleaner body 310 may include a dust separator 312 for separating dust and a dust container 314 in which the dust separated by the dust separator 312 are stored. External air may be introduced by suction force generated in the cleaner body 310 through the suction nozzle 340 and the extension tube 330 and may be moved to the dust container 314 provided in the cleaner body 310. Hereinafter, detailed descriptions of the cleaner 300 will be omitted.

The charging stand 100 includes a first body 110 and a second body 110a.

The first body 110 includes a charging port 113 (or a first charging port). The charging port 113 may be in contact with terminals of the cleaner 300 to charge the battery provided in the cleaner 300.

An extra battery 302 may be accommodated in the second body 110a. The second body 110a may additionally include a charging port (117d) (see FIG. 6) (or a second charging port) for charging the extra battery 302.

Extra nozzles 303 and 304 may be coupled to the charging stand 100. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand 100, the risk of loss is reduced, and a user may easily use the same. The extra nozzles 303 and 304 may be named accessories.

Fixing parts 115a and 115b for fixing the charging stand 100 to a wall surface may be provided on a rear surface 111 of the first body 110. Accordingly, the charging stand 100 may be fixed to the wall surface. For example, the fixing parts 115a and 115b may have a hole or groove shape. Accordingly, nails or the like, which are installed on the wall surface, are inserted into the fixing parts 115a and 115b, so that the first body 110 may be fixed to the wall surface.

A support part 112 for supporting the cleaner body 310 may be provided in the second body 110a. The support part 112 may support the cleaner body 310 from below.

The charging stand 100 may further include a locking part 120 provided in the first body 110. The locking part 120 may be coupled to the cleaner 300 to stably fix the cleaner 300.

In detail, the locking part 120 may be coupled to the battery housing 320 to support the cleaner 300. An inner peripheral surface of the locking part 120 may have a shape corresponding to an outer peripheral surface of the battery housing 320 to surround the outer peripheral surface of the battery housing 320.

The user may selectively rotate the locking part 120 forward/rearward such that the locking part 120 may be coupled to the battery housing 320. The locking part 120 may include an anti-slide part 122 for providing friction force such that the user may easily grip the locking part 120. The anti-slide part 122 may include a plurality of bosses on an outer peripheral surface of the locking part 120.

The cleaner holder 10 may further include a stand 200 for supporting the charging stand 100.

The stand 200 may include a base 210 supported on a floor and a support 220 provided in the base 210. The support 220 may be detachably coupled to the charging stand 100.

The support 220 may extend from the base 210 in a vertical direction. The support 220 may be coupled to an electric wire 114 provided in the charging stand 100. The electric wire 114 may extend from the rear surface 111 of the first body 110 to be connected to an external power source.

The base 210 may include an inclined surface 213 on which the suction nozzle 340 of the cleaner 300 is held and a stopper 215 for preventing the suction nozzle 340 of the cleaner 300 from being separated therefrom.

The stopper 215 may protrude from an end of the inclined surface 213. The stopper 215 serves to support the suction nozzle 340 such that a state in which the suction nozzle 340 is stably seated on the base 210 may be maintained. In some cases, the weight of the cleaner 300 may be supported by the support part 112 as well as a portion of the base 210, such as the stopper 215. That is, the weight of the cleaner 300 may be transferred to the stand 200 via both the charging stand 100, which supports the cleaner body 310, and the base 210, which supports the suction nozzle 340. In some cases, when the cleaner 300 is coupled to the charging stand 100 and supported by the stand 200, as seen for example in FIG. 4, the highest point of the charging stand 100 may be positioned vertically higher than the highest point of the cleaner 300.

Hereinafter, a method for coupling the cleaner 300 to the holder 10 will be described.

Figure 5A:
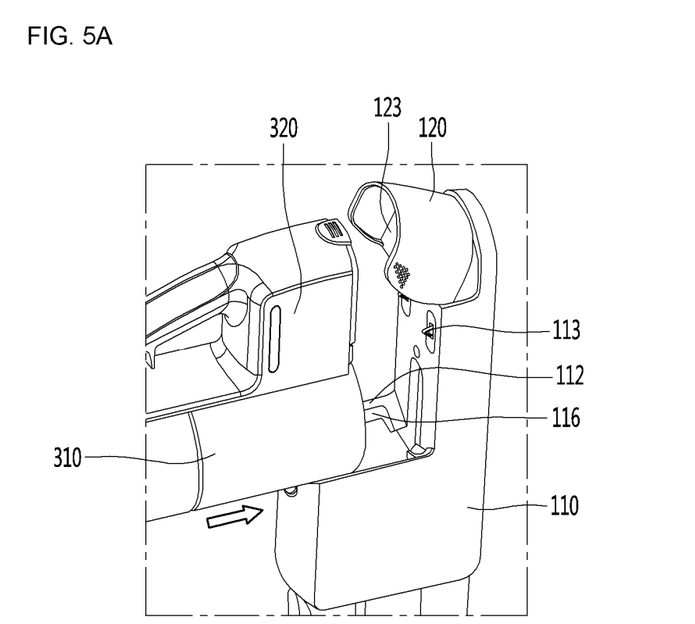
FIG. 5A is a view illustrating a state in which the cleaner is coupled to a support part.
Figure 5B:
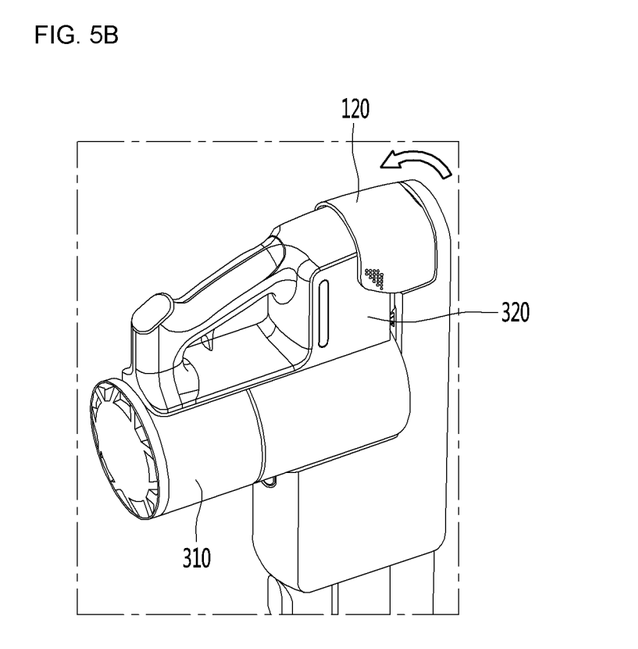
FIG. 5B is a view illustrating a state in which a locking part is coupled to the cleaner.

FIG. 5 is a view illustrating a state in which a cleaner is held on the cleaner holder. In detail, FIG. 5A illustrates a state in which the cleaner is coupled to a support part, and FIG. 5B illustrates a state in which the locking part is coupled to the cleaner.

Referring to FIG. 5, a cleaner guide 116 for guiding movement of the cleaner body 310 may be provided in the second body 110a.

The cleaner guide 116 may be provided inside the support part 112. Accordingly, the cleaner body 310 may be moved forward/rearward along the cleaner guide 116 while being supported by the support part 112. As illustrated, the cleaner body 310 is moved along the cleaner guide 116 to come into contact with the charging port 113. The cleaner body 310 may be inserted along various directions into the cleaner holder to be charged. For example, the cleaner body 310 may be guided in a downward direction by the cleaner holder to make appropriate contact with the charging port 113.

The locking part 120 may be rotatably connected to the first body 110 within a predetermined angle. FIG. 5A illustrates a state in which the locking part 120 is maximally rotated rearward (in a clockwise direction in FIG. 5A).

The first body 110 may include an elastic member (not illustrated) for applying elastic force to the locking part 120. In a state in which the locking part 120 is rotated rearward, the elastic member (not illustrated) may apply elastic force to a rear side thereof such that a state in which the locking part 120 is rotated rearward is maintained.

The locking part 120 may include a push part 123. The push part 123 may be provided inside the locking part 120. The push part 123 may be pressed by the battery housing 320 while the cleaner body 310 is moved along the cleaner guide 116.

When the push part 123 is pressed by the battery housing 320, the locking part 120 may be operated.

In detail, when the locking part 120 is operated, the locking part 120 may be rotated forward (in a counterclockwise direction in FIG. 5B) to be coupled to the outer peripheral surface of the battery housing 320. Accordingly, the locking part 120 may cover at least a portion of the battery housing 320.

When the locking part 120 is rotated forward, the elastic member (not illustrated) may apply elastic force such that a state in which the locking part 120 is rotated forward is maintained. Accordingly, the locking part 120 may serve to fix the battery housing 320 to the first body 110.

Figure 6:
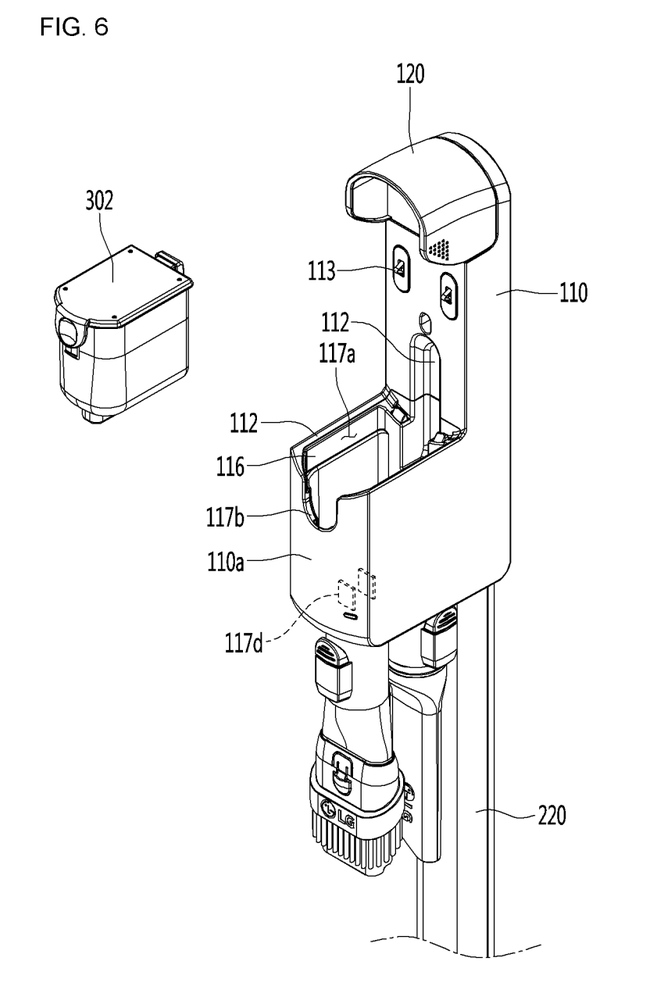
FIG. 6 is a view illustrating a state in which an extra battery is separated from the cleaner holder.

FIG. 6 is a view illustrating a state in which an extra battery is separated from the cleaner holder.

Referring to FIG. 6, the charging stand 100 includes the second body for accommodating the extra battery 302.

The second body 110a may protrude from the first body 110. A battery accommodating space 117a in which an extra battery 302 is to be accommodated may be formed in the second body 110a. The battery accommodating space 117a may be recessed rearward from one surface of the second body 110a. Further, the battery accommodating space 117a may be provided inside the support part 112 and the cleaner guide 116.

A charging port 117d for charging the extra battery 302 is provided inside the battery accommodating space 117a.

The first and second bodies 110 and 110a may include grooves 117b and 117c for allowing the extra battery 302 accommodated in the battery accommodating space 117a to be easily gripped.

The grooves 117b and 117c may include a first groove 117b provided in front of the battery accommodating space 117a and a second groove 117c provided on a rear side of the battery accommodating space 117a.

Figure 7:
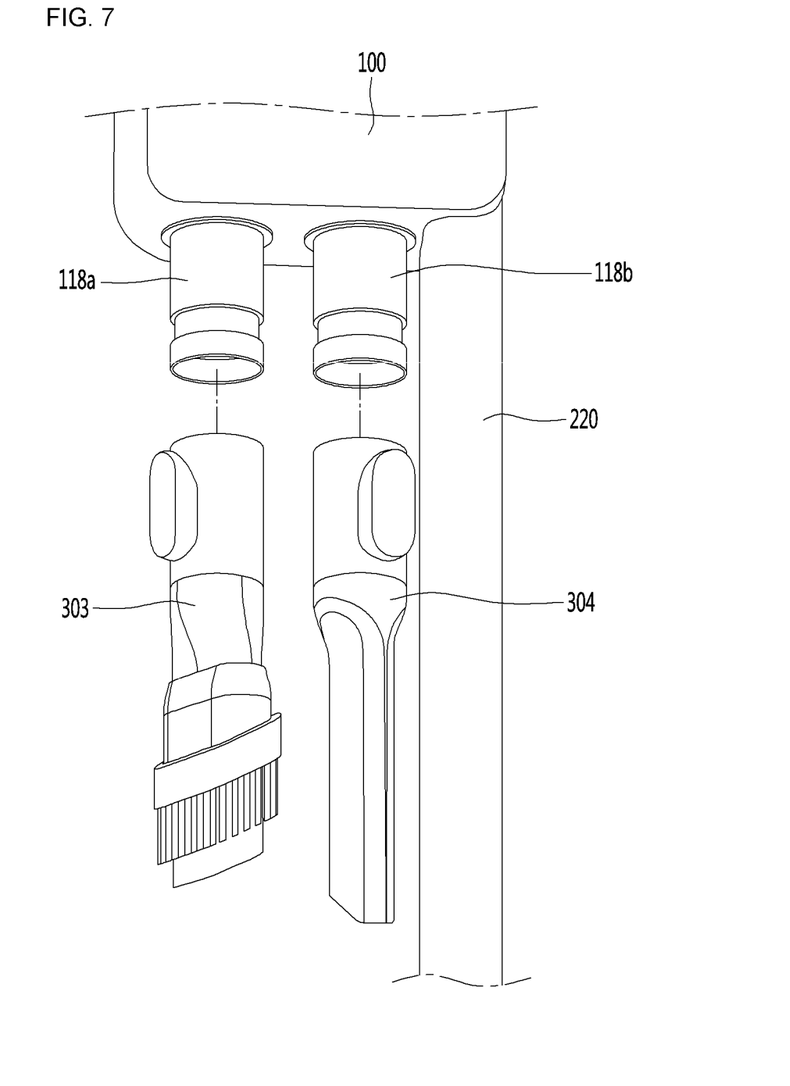
FIG. 7 is a view illustrating a state in which a nozzle is separated from a charging stand.

FIG. 7 is a view illustrating a state in which a nozzle is separated from a charging stand.

Referring to FIG. 7, the charging stand 100 may include connectors 118a and 118b to which the extra nozzles 303 and 304 are selectively coupled. The connectors 118a and 118b may extend from one side of the charging stand 100. The connectors 118a and 118b may be provided in, for example, the first body 110 or the second body 110a.

The user may attach/detach the nozzles 303 and 304 to the connectors 118a and 118b as needed. Accordingly, because the extra nozzles 303 and 304 are easily stored and used, user convenience may be improved.

Here, in a state in which the stand 200 is coupled to a stand coupling part 119 of the charging stand 100, the connectors 118a and 118b may be located in front of the stand 200.

Figure 8:
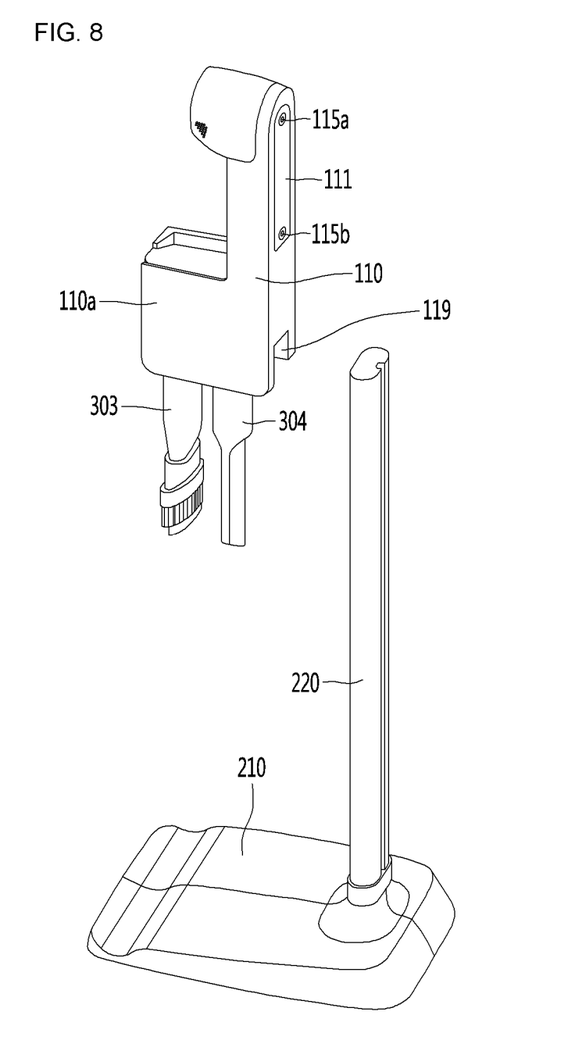
FIG. 8 is a view illustrating a state in which the charging stand is separated from the support.
Figure 9:
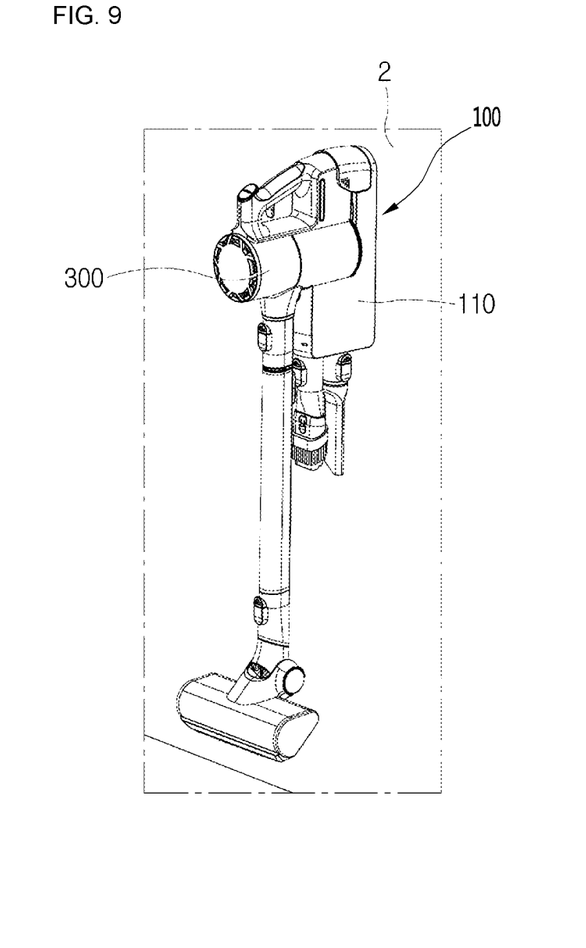
FIG. 9 is a view illustrating a state in which the charging stand on which the cleaner is held is mounted on a wall surface.

FIG. 8 is a view illustrating a state in which the charging stand is separated from the support, and FIG. 9 is a view illustrating a state in which the charging stand on which the cleaner is held is mounted on a wall surface.

Referring to FIGS. 8 and 9, the first body 110 may include a coupling part 119 to which the support 220 is coupled. The support 220 may be detachably coupled to the coupling part 119. Accordingly, the user may easily separate the charging stand 100 and the support 220 from each other.

As needed, the user may fix the charging stand 100 from which the support 220 is separated to a wall surface 2 using the fixing parts 115a and 115b.

When the cleaner holder according to the present disclosure is a wall-mounted type, the charging stand may be fixed to a wall surface in close contact with the wall surface in a state in which the stand is separated from the charging stand, so that space utilization is excellent.

Figure 10:
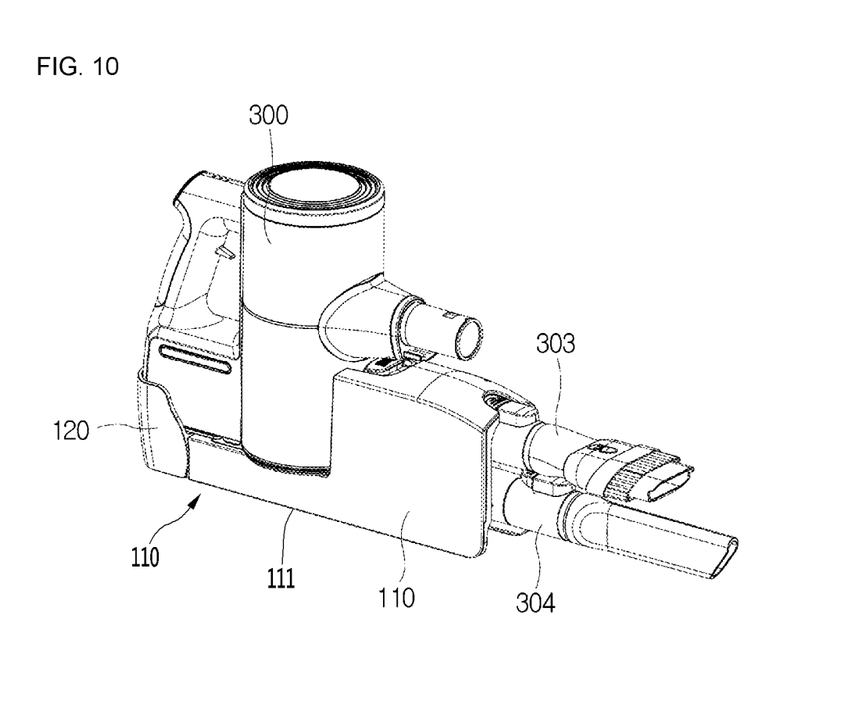
FIG. 10 is a view illustrating a state in which a charging stand is supported by a floor.

FIG. 10 is a view illustrating a state in which the charging stand is supported by the floor.

Referring to FIG. 10, the rear surface 111 of the first body 110 may be supported by the floor. To achieve this, the rear surface 111 of the first body 110 may have a planar shape. In this way, because the charging stand 100 may be held in various schemes according to a usage situation, user convenience may be improved.

When the cleaner holder according to the present disclosure is a floor-mounted type, unlike a stand type or a wall-mounted type, a separate member for installation of the charging stand is not required, so that a danger of overturning is minimized as the center of gravity is located on a lower side.

What is claimed is:

1. A cleaner holder comprising:
   a first body that includes a first charging port, the first charging port being configured to charge a cleaner in a vertical orientation;
   a second body that protrudes from the first body and that is configured to support a dust container of the cleaner in the vertical orientation; and
   a battery accommodating space that is defined in the second body, the battery accommodating space being recessed from an upper surface of the second body and configured to receive a cleaner battery that has been detached from the cleaner,
   wherein the second body includes a second charging port within the battery accommodating space, the second charging port being configured to charge the detached cleaner battery, and
   wherein the dust container of the cleaner is configured to, based on the second body supporting the dust container of the cleaner, cover at least a portion of the battery accommodating space.

2. The cleaner holder of claim 1, wherein the second body includes a front surface that is located rearward of a front end of the dust container based on the second body supporting the dust container.

3. The cleaner holder of claim 2, wherein the second body protrudes in a forward direction from a front surface of the first body, and
   wherein a distance in the forward direction from the front surface of the first body to the front surface of the second body is less than a distance in the forward direction from the front surface of the first body to the front end of the dust container based on the second body supporting the dust container.

4. The cleaner holder of claim 3, wherein a width of the second body between side surfaces in a lateral direction transverse to the forward direction is greater than a width of the dust container in the lateral direction.

5. The cleaner holder of claim 3, wherein the first charging port is located at the front surface of the first body vertically above the dust container based on the second body supporting the dust container.

6. The cleaner holder of claim 3, wherein the second body defines a first groove that is located at the front surface of the second body,
   wherein the first body defines a second groove that is recessed from the front surface of the first body,
   wherein the first and second grooves are configured to communicate with the battery accommodating space and to provide grip to the cleaner battery received in the battery accommodating space.

7. The cleaner holder of claim 6, wherein the battery accommodating space is located between the first groove and the second groove,
   wherein the first groove has an upper portion configured to be covered by the dust container based on the second body supporting the dust container, and
   wherein the second groove include a front portion configured to be covered by the dust container based on the second body supporting the dust container.

8. The cleaner holder of claim 1, wherein the second body further comprises an accessory holder located at a bottom surface of the second body and configured to receive a nozzle that has been detached from the cleaner.

9. The cleaner holder of claim 8, wherein the accessory holder comprises a plurality of accessory holders located at the bottom surface of the second body.

10. The cleaner holder of claim 1, wherein the first charging port is located vertically above the second charging port and configured to charge the cleaner in the vertical orientation independent of the second charging port.

11. The cleaner holder of claim 1, further comprising:
    a base configured to rest on ground; and
    a support that extends from the first body to the base,
    wherein the support is configured to, based on the second body supporting the dust container of the cleaner, transfer a first portion of a weight of the cleaner to the base.

12. The cleaner holder of claim 11, wherein the base is configured to, based on the second body supporting the dust container, support a suction nozzle of the cleaner that is configured to contact the base and to transfer a second portion of the weight of the cleaner to the base.

13. The cleaner holder of claim 12, wherein the base is configured to receive the second portion of the weight of the cleaner through an extension tube that extends from the dust container to the suction nozzle in a direction parallel to the support.

14. The cleaner holder of claim 12, wherein the base protrudes forward from the suction nozzle of the cleaner based on the base supporting the suction nozzle of the cleaner.

15. The cleaner holder of claim 12, wherein the base includes an upper surface that is inclined with respect to ground, and
    wherein the upper surface of the base includes a front portion configured to contact the suction nozzle and a connection portion located rearward of the front portion and configured to be coupled to the support.

16. The cleaner holder of claim 15, wherein the upper surface of the base defines a recess located at the front portion and configured to contact the suction nozzle.

17. The cleaner holder of claim 15, wherein the second body protrudes in a forward direction from a front surface of the first body, and
    wherein a distance from the connection portion to a front end of the base is greater than a distance from the front surface of the first body to a front surface of the second body.

18. The cleaner holder of claim 17, wherein the upper surface of the base further includes a rear end located rearward of the connection portion,
    wherein the distance from the connection portion to the front end of the base is greater than a distance from the connection portion to the rear end of the base, and
    wherein the rear end of the base protrudes rearward of a rear surface of the support.

19. The cleaner holder of claim 18, wherein the rear surface of the support is coplanar with a rear surface of the first body.

20. The cleaner holder of claim 1, wherein the first body includes a rear surface configured to rest on ground and to support the cleaner in a horizontal orientation transverse to the vertical orientation, and
    wherein the first body is configured to support the dust container and a battery holder of the cleaner located adjacent to the dust container on a surface of the first body.

* * * * *